(12) United States Patent
Sieme

(10) Patent No.: US 11,148,580 B2
(45) Date of Patent: Oct. 19, 2021

(54) RECEIVING ASSEMBLY FOR A HEADLIGHT RANGE ADJUSTING DEVICE WITH THERMAL COMPENSATION MEANS

(71) Applicant: HELLA GMBH & CO. KGAA, Lippstadt (DE)

(72) Inventor: Joerg Sieme, Georgsmarienhuette (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 0 days.

(21) Appl. No.: 16/943,592

(22) Filed: Jul. 30, 2020

(65) Prior Publication Data

US 2020/0353860 A1 Nov. 12, 2020

Related U.S. Application Data

(63) Continuation of application No. PCT/EP2019/051712, filed on Jan. 24, 2019.

(30) Foreign Application Priority Data

Jan. 30, 2018 (DE) .................... 10 2018 101 983.1

(51) Int. Cl.
*B60Q 1/06* (2006.01)
*F21S 41/19* (2018.01)

(52) U.S. Cl.
CPC .............. *B60Q 1/06* (2013.01); *F21S 41/192* (2018.01)

(58) Field of Classification Search
CPC ........................... B60Q 1/045; B60Q 2200/34
See application file for complete search history.

(56) References Cited

U.S. PATENT DOCUMENTS 8,888,345 B2 * 11/2014 Tillmann ............... B60Q 1/076
362/549
9,090,204 B2 * 7/2015 Leisse .................. B60Q 1/0683

FOREIGN PATENT DOCUMENTS

| DE | 2 310 871 | 9/1973 |
| DE | 10 2010 009 283 A1 | 8/2011 |
| DE | 10 2011 000 735 A1 | 8/2012 |
| DE | 10 2012 111 311 A1 | 5/2014 |
| EP | 2 280 221 A2 | 2/2011 |
| FR | 2 972 041 A1 | 8/2012 |

* cited by examiner

*Primary Examiner* — William J Carter
(74) *Attorney, Agent, or Firm* — Muncy, Geissler, Olds & Lowe, P.C.

(57) ABSTRACT

A receiving assembly for a headlight range adjusting device for a lighting module in a headlight of a vehicle, with a receiving area for the headlight range adjusting device and with thermal compensator to compensate for a temperature-related displacement of a connection point for the lighting module in an adjustment axis of the headlight range adjusting device. The compensator has at least one profiled receiving area which extends in the adjustment axis and which is made of a first material with a first coefficient of thermal expansion, and the compensator has at least one receiving slide which extends in the adjustment axis and which is made of a second material with a second coefficient of thermal expansion, which is received in the profiled receiving area in the adjustment axis so as to be displaceable.

8 Claims, 2 Drawing Sheets

RECEIVING ASSEMBLY FOR A HEADLIGHT RANGE ADJUSTING DEVICE WITH THERMAL COMPENSATION MEANS

This nonprovisional application is a continuation of International Application No. PCT/EP2019/051712, which was filed on Jan. 24, 2019, and which claims priority to German Patent Application No. 10 2018 101 983.1, which was filed in Germany on Jan. 30, 2018, and which are both herein incorporated by reference.

BACKGROUND OF THE INVENTION

Field of the Invention

The present invention relates to a receiving assembly for a headlight range adjusting device for a lighting module in a headlight of a vehicle, with a receiving area for the headlight range adjusting device and with a thermal compensator to compensate for a temperature-related displacement of a connection point for the lighting module in an adjustment axis of the headlight range adjusting device.

Description of the Background Art

DE 10 2012 111 311 A1, which corresponds to U.S. Pat. No. 9,090,204, which is incorporated herein by reference, discloses a receiving assembly for a headlight range adjusting device for a lighting module in a headlight of a vehicle, and the headlight range adjusting device is received in the housing of the headlight, which forms the receiving area for the headlight range adjusting device. The headlight range adjusting device remains adjustable in the adjustment axis, and the adjustment can be carried out manually by means of an aligning device comprising a threaded rod and comprising a threaded receiving area. The threaded receiving area is designed with means that serve to thermally compensate temperature-related displacements of a connection point of the headlight range adjusting device. If the assembly heats up, the temperature-related displacement of the connection point can cause the lighting module in the headlight to move, and thermal compensation portions of the connecting element are used to compensate for the movement. The compensation for the temperature-related displacement is carried out by materials selected to be different for, for example, the connecting element with the thermal compensation sections and the threaded rod, so that, for example, an elongation of the threaded rod in a first direction of the adjustment axis is compensated for by an elongation of the thermal compensation section in the direction counter to the adjustment axis.

Conventional connecting elements between an aligning device and the headlight range adjusting device cannot, however, be used in a headlight of a vehicle for differently designed receiving areas of headlight range adjusting devices.

DE 10 2011 000 735 A1, which corresponds to U.S. Pat. No. 8,888,345, which is incorporated herein by reference, discloses a receiving assembly for receiving a lighting module in the housing of a headlight for a vehicle, and the receiving assembly forms a thermal expansion compensator in order to ensure that the distance between the housing and the lighting module is as unchanged as possible even when temperatures change. For this purpose, a pin body is provided, which extends into a compensating body, and along a pin axis the connection between the pin body and the compensating body can be made variably with a stop element, which can be optionally attached to different positions along the pin axis for this purpose. Different coefficients of thermal expansion of the compensating body and the pin body create the possibility of maintaining a mostly constant distance between a connector of the pin body to the housing and the lighting module even when the temperature changes.

However, conventional receiving assemblies are not suitable for receiving a headlight range adjusting device for a lighting module in a headlight of a vehicle.

Another assembly of a lighting module in a headlight with a corresponding receiving assembly is disclosed in DE 10 2010 009 283 A1. The receiving assembly is used to connect a support frame to a housing and has a compensator for thermal compensation. The compensator for thermal compensation comprise a receiving element which has a slide-like lower part, and the slide-like lower part is guided in a profile, the profile having a number of holes through which corresponding connecting elements can be inserted. Different compensation lengths to compensate for temperature-related displacements result depending on the position in which the connector for connecting the profile with the slide is introduced.

After configuring the lighting module in the headlight, and once it has been measured to which order of magnitude thermal compensation is required, a corresponding hole can be selected in order to pass the connecting element through this. This creates a rigid connection between the profile and the slide, and the compensation length thus generated allows for the thermal displacement of the lighting module occurring in the headlight to be compensated accordingly. The result is a mostly displacement-free assembly of the lighting module in the headlight over a wide range of temperatures.

SUMMARY OF THE INVENTION

It is therefore an object of the present invention to further develop a receiving assembly for a headlight range adjusting device for a lighting module in a headlight of a vehicle, which enables thermal compensator to compensate for the temperature-related displacement of a connection point of the headlight range adjusting device for the lighting module in an adjustment axis. The thermal compensator should be as simple as possible. In particular, it is the object of the invention to configure a required compensation length, wherein ideally the device should be able to be integrated in the headlight during the assembly process of the headlight range adjusting device.

The invention includes the technical teaching that the thermal compensator comprises at least one profiled receiving area, which extends in the adjustment axis and which is made of a first material with a first coefficient of thermal expansion, and that the compensator has at least one receiving slide, which extends in the adjustment axis and which is made of a second material with a second coefficient of thermal expansion, which slide is displaceably received in the profiled receiving area in the adjustment axis, and that the profiled receiving area has multiple plastically deformable portions arranged one after the other in the adjustment axis, which can be introduced into depressions of the receiving slide under mechanical action.

The main advantage of the inventive design of the thermal compensator is that the compensator is integrated in the receiving assembly for receiving the headlight range adjusting device in the housing of the headlight. The assembly of the receiving slide in the profiled receiving area can serve as a connection between a bracket and the receiving area, so that the compensator can also be adjusted accordingly while the headlight range adjusting device is being installed in the housing of the headlight. Introducing, in particular bending, the plastically deformable portion into the depression produces the shape-locked connection between the receiving slide and the profiled receiving area in the direction of the adjustment axis, and precisely that portion which is located at the position in the adjustment axis direction at which the required thermal compensation is made possible can be plastically deformed and introduced into the depression.

Thus, already during assembly of the headlight range adjusting device in the housing of the headlight, the thermally-geometrically necessary connection between the receiving slide and the profiled receiving area is established in such a way that thermal compensation is enabled, by means of which ultimately, over a wide range of temperatures, the connection point of the headlight range adjusting device is not displaced relative to the connection of the lighting module. No additional elements are required that go beyond using the receiving area with an appropriate bracket for receiving the headlight range adjusting device in the housing of the headlight.

A particular advantage is achieved if the profiled receiving area forms a structural portion of the receiving area, wherein the receiving area also has a flange portion for fastening in or on a housing of the headlight. A further advantage is achieved when the receiving slide forms a structural portion of a bracket in which the headlight range adjusting device is received. This means that two components are sufficient to mount the headlight range adjusting device in the headlight housing, namely the receiving area and the bracket. The thermal compensator are located at the interface between the receiving area and the bracket, formed by the receiving slide arranged in the profiled receiving area.

An even further advantage is that the receiving area has two profiled receiving areas and the bracket has two receiving slides, wherein the headlight range adjusting device is received between the two receiving slides in the bracket. This creates a mechanically stable assembly between the receiving area and the bracket in order to rigidly arrange the headlight range adjusting device in the housing of the headlight, wherein the rigid assembly comprises the thermal compensator.

Furthermore, it can be provided that the bracket has a ring body with a bayonet into which the headlight range adjusting device can be bayoneted, wherein the receiving slides are arranged at opposite positions on the ring body. The bayonet can be designed as a geometric configuration in or within the ring body. Corresponding counter geometries can be located on the headlight range adjusting device.

The thermal compensation is based on different coefficients of thermal expansion of the receiving area and the bracket. In order to achieve different coefficients of thermal expansion, provision can be made for the receiving area with the at least one profiled receiving area to be made of a metallic material, and for the bracket with the at least one receiving slide to be made of a plastic. The factor between the coefficients of thermal expansion of a metallic material, for example steel, and a correspondingly selected plastic can range from 1:10 to 1:200, wherein the coefficient of thermal expansion of the plastic represents the correspondingly higher value as compared to the coefficient of thermal expansion of a steel material. The bracket with the at least one receiving slide can thus be injection molded from a plastic material, and the receiving area with the U-shaped profiled receiving area can be made from a sheet metal material in a stamping and bending process. The respective manufacturing process and the selected materials form advantageous embodiments. However, it is also conceivable to manufacture the bracket from a metallic material and the receiving area from a plastic.

In particular, the profiled receiving area can surround the receiving slide in a U-shaped manner, wherein the plastically deformable portions can be formed in a base portion of the U-shape and wherein guide springs can be formed in one or both legs of the U-shape, so that the receiving slide is guided in the profiled receiving area free of play. In particular, the plastically deformable portions can have a width which is designed such that when the portions are bent into the depressions, lateral tension is generated, causing this to be carried out free of play in the direction of the adjustment axis. The guide springs tension the receiving slide in the profiled receiving area in the lateral direction. The result is a play-free assembly of, for example, two receiving slides in two assigned profiled receiving areas. The result is a play-free connection between the receiving area and the bracket, and if the headlight range adjusting device is bayonet-fitted into the ring body of the bracket, a play-free connection between the headlight range adjusting device and the bracket is also achieved.

With their U-shaped design, the profiled receiving areas are designed in such a way that the plastically deformable portions can be accessed from the outside, for example in the form of spring tongues, and that they can be pressed into the depressions in the receiving slide using a suitable tool. If, for example, five, six, seven or more deformable portions are arranged over the longitudinal extension of the profiled receiving area, the compensation length that can be selected can be one to several centimeters, so that the length of the headlight range adjusting device is substantially utilized in the direction of the adjustment axis.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
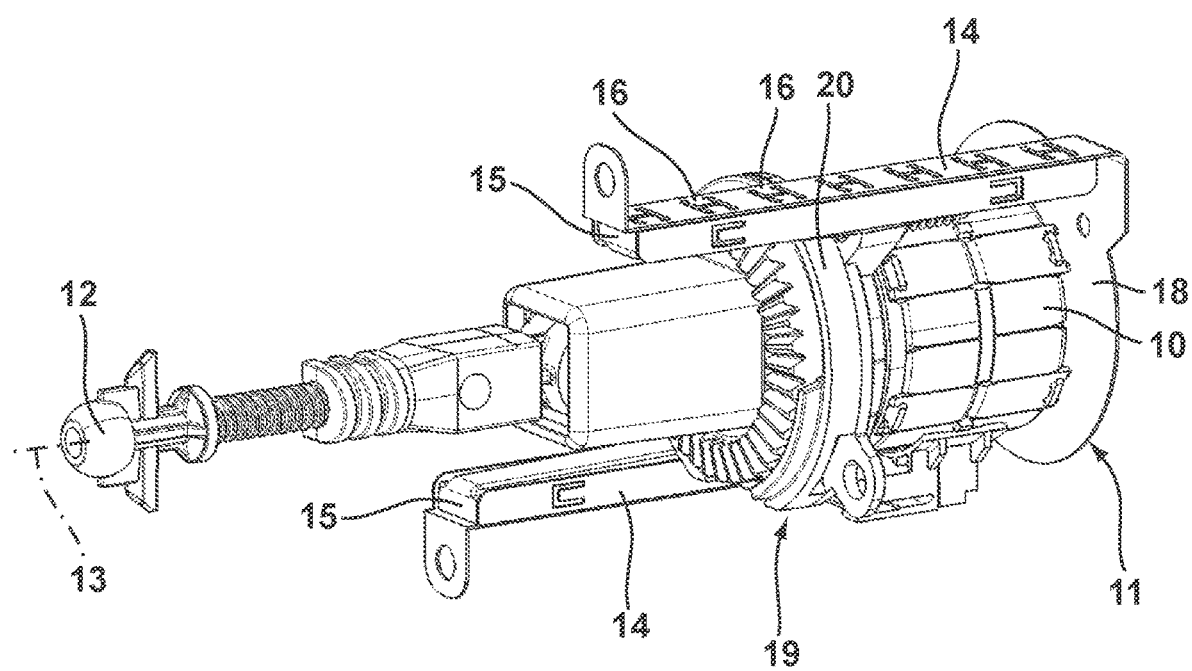
FIG. 1 shows an overall view of a receiving assembly for a headlight range adjusting device with thermal compensator.

FIG. 1 shows a receiving assembly for receiving a headlight range adjusting device 10 for the assembly in the housing of a headlight for a vehicle. The headlight range adjusting device 10 is used to change the position of a lighting module of the headlight within the housing, for which purpose a connection point 12 is provided, which can be moved along an adjustment axis 13 by means of the headlight range adjusting device 10. The connection point 12 serves to connect the lighting module, and by moving it along the adjustment axis 13, the lighting module can be tilted forward and backward in the headlight, for example, in order to change the light-dark boundary of the headlight in height.

The receiving assembly comprises the receiving area 11 and the bracket 19 as essential receiving components. The receiving area 11 has a flange portion 18 on the rear side, so that the receiving area 11 can be fastened, for example, to the housing of the headlight. Furthermore, the receiving area 11 has two profiled receiving areas 14 which run at a distance from one another, and the profiled receiving areas 14 likewise run parallel to the adjustment axis 13 in their longitudinal extension.

The bracket 19 has a ring body 20 in which the headlight range adjusting device 10 is used and receiving slides 15 are formed laterally on the ring body 20 which are received in the U-shaped profiled receiving areas 14. The receiving slides 15 can be moved in the adjustment axis direction of the adjustment axis 13 within the profiled receiving area 14, as long as the portions 16 are not bent to the inside. Positioning the bracket 18 on the receiving area 11 and disposing the receiving slides 15 in the profiled receiving area 14 already results in a secure assembly of the headlight range adjusting device 10 on the receiving area 11, wherein the headlight range adjusting device 10 remains movable in the adjustment axis 13 as a remaining degree of freedom by the receiving slides 15 being able to be displaced in the profiled receiving areas 14.

The receiving assembly shown comprises thermal compensator for compensating for a temperature-related displacement of the connection point 12 relative to the housing-fixed receiving area 11. The thermal compensator are formed by the receiving slides 15, which are received in the profiled receiving areas 14. The receiving area 11 is made of a metallic material, for example as a sheet metal component manufactured in a stamping and bending process, and the bracket 19 is made of a plastic injection molded component. As a result, the receiving area 11 and the bracket 19 have coefficients of temperature expansion that are clearly different from one another, and a temperature change results in a considerably greater elongation or shortening of the receiving slide 15 as compared to the profiled receiving area 14.

The thermal compensation can be configured in such a way that the different coefficients of expansion can be used to compensate for the resulting displacement of the connection point 12 relative to the bracket 19. The length of the compensation between the profiled receiving area 14 and the receiving slide 15 is determined by the portions 16, which can be pressed into depressions within the receiving slide 15, which are not visible. The portion 16 is designed as a flexible tab and the compensation length can be determined by the choice of the portion 16, which is bent inwards in the direction of the receiving slide 15, into the profiled receiving area 14. With a correspondingly bent portion 16, a rigid connection point between the profiled receiving area 14 and the receiving slide 15 is formed in the adjustment axis direction of the adjustment axis 13. The resulting free compensation length thereby determines the compensation path by means of the difference in the coefficient of thermal expansion. If, for example, given the structure of the headlight range adjustment device, the connection point 12 grows out of the bracket 19 due to an increase in temperature, then a portion which is formed remote from the flange portion 18 can be bent in order to use the significant length increase of the portion of the receiving slide 15, as compared to the profiled receiving area 14, to effectively return the drift of the connection point 12 and to compensate in this way.

Figure 2:
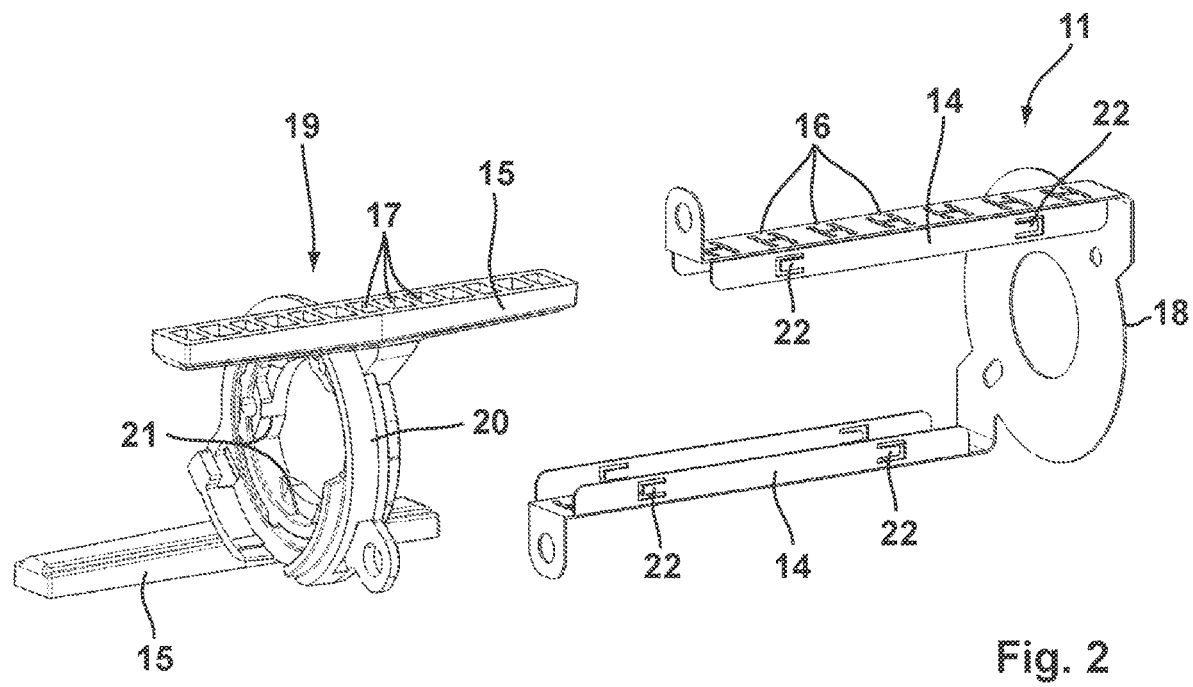
FIG. 2 shows a separate assembly of a receiving area made of a metallic material and a bracket made of an injection molded plastic.

FIG. 2 shows a perspective isolated view of the receiving area 11 and the bracket 19. The bracket 11 consists of a metallic stamped and bent component with a flange portion 18 as well as profiled receiving areas 14 adjoining thereto. The profiled receiving areas 14 have a U-shape and have several portions 16 at regular intervals on their base section, which are formed like a tab or tongue and can be bent inwards into the U-shape. On the side of the profiled receiving area 14 legs there are guide springs 22 with which the receiving slide 15 of the bracket 19 can be guided free of play.

The bracket 19 has a ring body 20 with a bayonet 21 formed therein to receive the headlight range adjusting device. The bracket 19 is formed from a plastic injection molded component and has receiving slides 15 arranged laterally at approximately opposite positions of the ring body 20. The receiving slides 15 can be inserted into the U-shape of the profiled receiving areas 14, and, corresponding to the assembly of the portions 16, the receiving slides 15 have depressions 17 into which the portions 16 can be bent. The positions of the portions 16 in the adjustment axis direction of the adjustment axis 13 do not have to correspond with the depressions 17, so that a displacement of the receiving slide 15 within the profiled receiving area 14 does not cause the portions 16 to be inserted into the depressions 17 only in their discrete positions. Rather, there may be significantly more depressions 17 on the receiving slides 15 than there are portions 16 on the profiled receiving areas 14.

Figure 3:
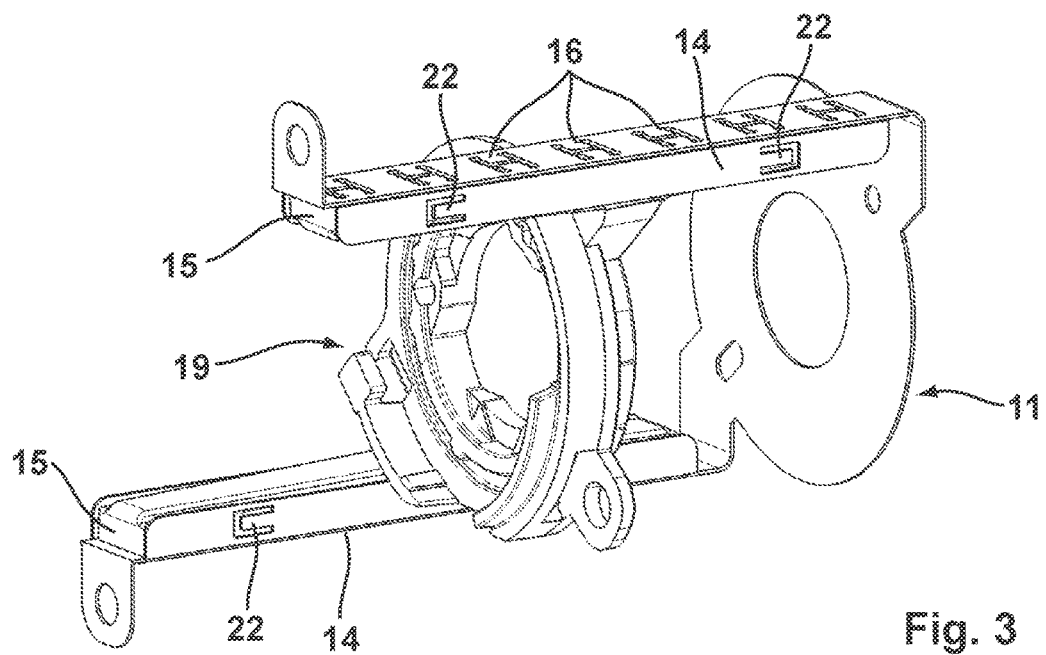
FIG. 3 shows an interlocked assembly of the receiving area with the bracket.

Finally, FIG. 3 shows a further perspective view of the bracket 19, which is joined with its receiving slides in the receiving area 11, so that these are enclosed in the profiled receiving areas 14. The guide springs 22 thereby press laterally against the receiving slides 15 and, if either a portion 16 of the first profiled receiving area 14 or a portion 16 of the second profiled receiving area 14 are bent, then a rigid connection of the bracket 19 within the receiving area 11 is created.

The embodiment of the invention is not limited to the preferred exemplary embodiment provided above. Rather, a number of variants are conceivable which make use of the solution shown, even in the case of fundamentally different embodiments. All of the features and/or advantages resulting from the claims, the description or the drawings, including structural details, spatial assemblies and method steps, can be essential to the invention both individually and in a wide variety of combinations.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A receiving assembly of a headlight range adjusting device for a lighting module in a headlight of a vehicle, the receiving assembly comprising:
   a receiving area for the headlight range adjusting device; and
   a thermal compensator to compensate for a temperature-related displacement of a connection point for the lighting module in an adjustment axis of the headlight range adjusting device, wherein the thermal compensator has at least one profiled receiving area that extends in the adjustment axis and that is made of a first material with a first coefficient of thermal expansion, wherein the thermal compensator has at least one receiving slide that extends in the adjustment axis and that is made of a second material with a second coefficient of thermal expansion, the slide being received in the profiled receiving area in a movable manner in the adjustment axis, and wherein the profiled receiving area has a plurality of plastically deformable portions that are arranged one after the other in the adjustment axis, which are adapted to be introduced into depressions in the receiving slide under mechanical action.

2. The receiving assembly according to claim 1, wherein the profiled receiving area forms a structural portion of the receiving area, and wherein the receiving area further comprises a flange portion for fixing in or on a headlight housing.

3. The receiving assembly according to claim 1, wherein the receiving slide forms a structural portion of a bracket in which the headlight range adjusting device is received.

4. The receiving assembly according to claim 3, wherein the receiving area has two profiled receiving areas and that the bracket has two receiving slides, wherein the headlight range adjusting device is received between the two receiving slides in the bracket.

5. The receiving assembly according to claim 3, wherein the bracket has a ring body with a bayonet, in which the headlight range adjusting device is adapted to be bayoneted, and wherein the receiving slides are arranged at opposite positions on the ring body.

6. The receiving assembly according to claim 3, wherein the receiving area with the at least one profiled receiving area is made of a metallic material and/or wherein the bracket with the at least one receiving slide is made of a plastic material.

7. The receiving assembly according to claim 1, wherein the profiled receiving area surrounds the receiving slide in a U-shape, and wherein the plastically deformable portions are formed in a base portion of the U-shape and wherein guide springs are formed in one or both legs of the U-shape so that the receiving slide is guided in the profiled receiving area free of play.

8. The receiving assembly according to claim 1, wherein the plastically deformable portions form spring tongues, which are adapted to be impressed in the depressions in the receiving slide free of play.

* * * * *